United States Patent
Caponi

(10) Patent No.: US 12,117,969 B2
(45) Date of Patent: Oct. 15, 2024

(54) DATA CONVERSION AND SYNCHRONIZATION

(71) Applicant: OneLogin, Inc., San Francisco, CA (US)

(72) Inventor: Dominick Salvatore Caponi, Bellevue, WA (US)

(73) Assignee: OneLogin, Inc., San Francisco, CA (US)

( * ) Notice: Subject to any disclaimer, the term of this patent is extended or adjusted under 35 U.S.C. 154(b) by 303 days.

(21) Appl. No.: 17/464,385

(22) Filed: Sep. 1, 2021

(65) Prior Publication Data

US 2023/0083547 A1 Mar. 16, 2023

(51) Int. Cl.
*G06F 16/178* (2019.01)
*G06F 16/21* (2019.01)
*G06F 16/23* (2019.01)
*H04L 9/40* (2022.01)

(52) U.S. Cl.
CPC ........ *G06F 16/1794* (2019.01); *G06F 16/219* (2019.01); *G06F 16/2379* (2019.01); *H04L 63/102* (2013.01)

(58) Field of Classification Search
CPC ............. G06F 16/1794; G06F 16/2379; G06F 16/219; H04L 63/102
See application file for complete search history.

(56) References Cited

U.S. PATENT DOCUMENTS

| | | | |
|---|---|---|---|
| 2014/0181965 A1* | 6/2014 | Kling | H04L 63/105 726/21 |
| 2016/0275099 A1* | 9/2016 | Jarvie | G06F 16/214 |
| 2017/0070504 A1* | 3/2017 | Ramachandran | H04L 63/061 |
| 2017/0070536 A1* | 3/2017 | Mortman | H04L 41/00 |
| 2019/0095498 A1* | 3/2019 | Srinivasan | H04L 63/102 |
| 2019/0098055 A1* | 3/2019 | Pitre | H04L 63/20 |
| 2019/0102162 A1* | 4/2019 | Pitre | H04L 63/10 |
| 2019/0334911 A1* | 10/2019 | Parthasarathy | H04L 9/0891 |
| 2020/0110638 A1* | 4/2020 | Asthana | H04L 67/51 |
| 2020/0265062 A1* | 8/2020 | Srinivasan | G06F 16/1844 |
| 2020/0272670 A1* | 8/2020 | Vaishnavi | G06F 9/541 |
| 2020/0403858 A1* | 12/2020 | Nassar | G06F 16/903 |
| 2021/0036917 A1* | 2/2021 | Griffin | H04L 41/0895 |
| 2021/0081252 A1* | 3/2021 | Bhargava | G06F 9/5072 |
| 2021/0084031 A1* | 3/2021 | Lao | H04L 63/0807 |
| 2021/0160231 A1* | 5/2021 | Kumar | H04L 63/0815 |
| 2021/0392142 A1* | 12/2021 | Stephens | H04L 63/104 |
| 2022/0294849 A1* | 9/2022 | Mizan | G06F 16/214 |
| 2022/0385668 A1* | 12/2022 | Simonetti | H04L 63/20 |
| 2023/0052411 A1* | 2/2023 | Mucciarone | H04L 63/20 |

* cited by examiner

*Primary Examiner* — Huawen A Peng
(74) *Attorney, Agent, or Firm* — MASCHOFF BRENNAN

(57) ABSTRACT

A two staged, two output data conversion system synchronizes resources between IAM systems (including CIAM systems). For the first stage of the conversion process, data is obtained for each resource and stored in an interim file. For the second stage of the conversion process, the data is converted twice to create two output files: one output for a source IAM system and one output file for a destination IAM system.

20 Claims, 8 Drawing Sheets

Figure 2

| Field | Description |
|---|---|
| activated-at | Date and time at which the user's status was set to active. |
| comment | Notes entered about user. |
| created-at | date and time at which identity was created. |
| custom_attributes | Provides a list of custom attribute fields. |
| directory-id | ID of the directory (Active Directory, LDAP, for example) from which the user was created. |
| distinguished-name | Synchronized from Active Directory. |
| email | User's email address, which is also used to log in to Access Management System. |
| external_ID | External ID that can be used to uniquely identify the user in another system. |
| first_name | User's first name. |
| last_name | User's last name. |
| userID | Unique ID for user within Access Management System. |
| groupID | Group to which the user belongs. |
| invalid_login_attempts | Number of sequential invalid login attempts the user has made that is less than or equal to the Maximum invalid login attempts. When this number reaches this value, the user account will be locked for the amount of time defined by the Lock effective period. |
| last-login | Date and time of the user's last login. |
| locale | Represents a geographical, political, or cultural region. Some features may use the locale value to tailor the display of information, such as numbers, for the user based on locale-specific customs and conventions. |
| locked-until | Date and time at which the user's account will be unlocked. |
| manager_ID | ID of the user's manager. |
| password_changed | Date and time at which the user's password was last changed. |
| phone | User's telephone number. |
| role | Rile IDs to which the user is assigned. |
| state | Represents the user's stage in a process (such as user account approval). User state determines the possible statuses a user account can be in. States include: Unapproved, Approved, Rejected and Unlicensed. |
| status | The status of a user's account with the Access Management System. Possible values include Unactivated, Active, Suspended, Locked, Password expired, Awaiting password reset, Password Pending, and Security Question Required. |
| updated-at | Date and time at which the user's information was last updated. |
| username | If the user's directory is set to authenticate using a user name value, this is the value used to sign in. |
| password hash | A hash of the user's password. |
| salt | Random value used to created password hash. |

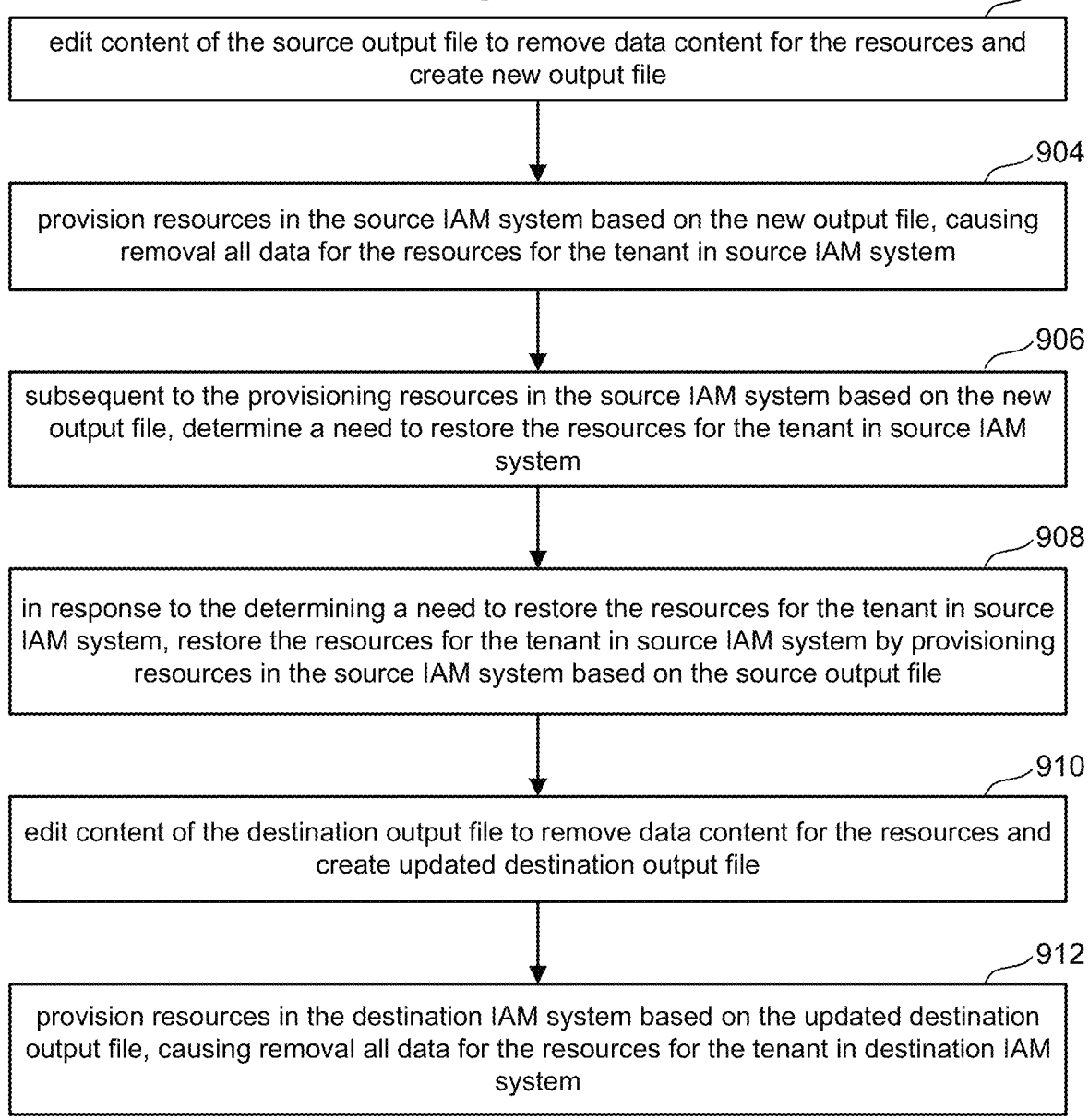

DATA CONVERSION AND SYNCHRONIZATION

BACKGROUND

Identity and access management (IAM) is a framework of policies and technologies for ensuring that the right users have the appropriate access to IT components. IAM systems not only identify, authenticate, and control access for individuals who will be utilizing IT components, but also for the hardware and applications people need to access.

IAM systems that are implemented in the cloud as software as a service (SaaS) and/or platform as a service (PaaS) can be referred to as cloud-based identity and access management (CIAM) platforms.

When a consumer entity purchases services from a IAM provider, there typically has been a degree of vendor lock in. That is, the IAM market is siloed, with customers going all in on one provider over another. This makes it difficult for consumers to migrate between IAM providers. For example, an IAM provider may be experiencing a disruption in IAM service, thereby preventing users from accessing IT components (e.g., service providers).

In the past, consumers can switch between IAM providers by developing software that is dedicated for the particular migration. Such an effort requires a lot of work and can be expensive. If the migration is not as successful as expected, it may be difficult to go back to the original IAM provider. Additionally, during or after a migration to a new IAM system, the original IAM system is often left unattended (which can be a security issue) and/or may become stale (thereby reducing its value). Additionally, if the migration was intended to be temporary, any changes made to the data in the temporary IAM system may not be propagated back to the original IAM system.

BRIEF DESCRIPTION OF THE DRAWINGS

Like-numbered elements refer to common components in the different figures.

FIG. 2 is a table that depicts an example set of fields for an identity record.

FIG. 9 is a flow chart describing one embodiment of a process for migrating to a new IAM system and subsequently migrating back to the original IAM system.

DETAILED DESCRIPTION

A two staged, two output data conversion system is proposed that synchronizes resources between IAM systems (including CIAM systems). In the first stage, a list of resources is obtained from a source IAM system, data is obtained for each resource in the list, and the data is stored in an interim file using a first syntax and in a format for the source IAM system. In the second stage, the data is converted twice to create two output files: one output for the source IAM system and one output file for the destination IAM system. The first conversion (of the second stage) comprises converting the data of the records of the interim file from the first syntax and the format for the source IAM system to a second syntax and the format for the source IAM system, thereby creating an output file for the source IAM system. The second conversion (of the second stage) comprises converting the data of the records of the interim file from the first syntax and the format for the source IAM system to the second syntax and a format for the destination IAM system, thereby creating an output file for the destination IAM system.

The two step conversion (e.g., first going to an interim file and then to output files) facilitates the efficient generation of the two output files. The benefits of the two output files comprise: while the output for the destination IAM system is used to migrate data to the destination IAM system, the output for the source IAM system can be used to go back to the source IAM system if the migration fails; an organization can run both the source IAM system and the destination IAM in parallel for fault tolerance purposes or to hedge against an outage of one system; having two output files allows the tracking of changes (e.g., using version control) for both the source IAM system and the destination IAM; the output for the source IAM system can be used to clear out the data for the source IAM system; and the two output files allows for the same changes to be easily made to both IAM systems in parallel.

Figure 1:
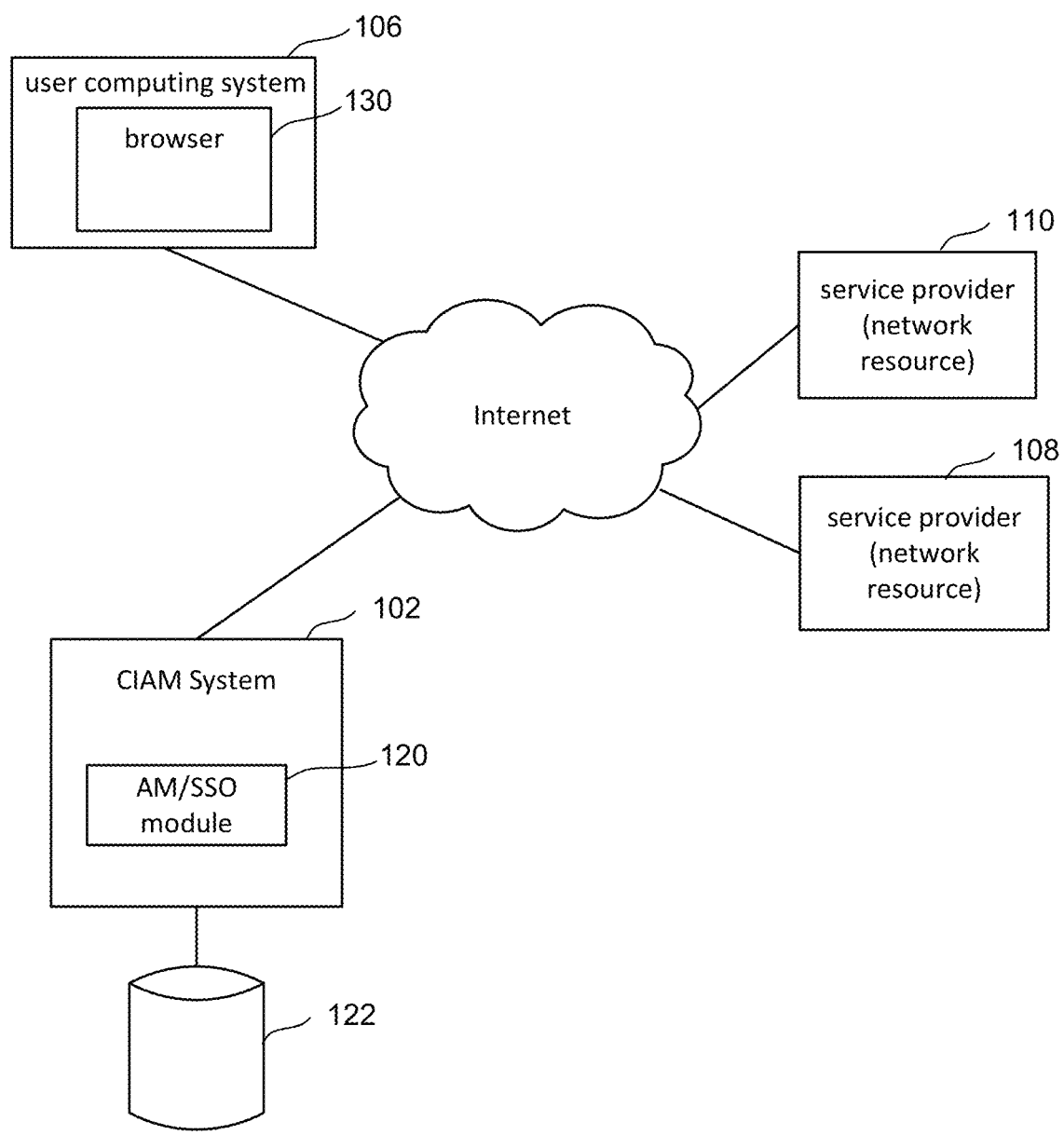
FIG. 1 is a block diagram of an IT/data processing system that implements the technology proposed herein.

FIG. 1 is a block diagram of an IT/data processing system that implements the technology proposed herein for converting and synchronizing data. FIG. 1 depicts CIAM system 102, first computing system 106, service provider 108, and service provider 110 all connected to the Internet via zero, one or more local area networks (or other types of networks). CIAM system 102 includes one or multiple servers (or other types of computers) that perform identify and access management services. In one embodiment, CIAM system 102 includes AM/SSO module 120, which is software running on the one or multiple servers that perform access management services. Each of those servers includes a communication interface (e.g., WiFi or wired Ethernet), local memory, solid state drive ("SSD") or hard disk drive, user interface and a processor (one or multi-core), all of which are connected to each other. The processor is configured (e.g., programmed) to perform the processes described below by executing processor readable code stored on a non-transitory processor readable storage medium.

CIAM system 102 includes an identity data store 122 that stores identifying information for the identities managed by CIAM system 102. Identity data store 122 can be connected to or otherwise in communication with any one or more of the servers that constitute CIAM system 102. Identity data store 122 can also be incorporated within one of those servers. CIAM system 102 uses a set of rules and policies to determine whether the managed identities can access network resources. In one embodiment, each of the identities managed by CIAM system 102 includes an identity record that comprises a set of fields of data. FIG. 2 is a table that depicts an example set of fields for an identity record stored in identity data store 122.

One example of an identity data store implements Active Directory, which is a directory service developed for Windows domain type networks. Active Directory allows management and storage of information using Lightweight Directory Access Protocol ("LDAP"). As a directory service, an Active Directory instance consists of a database and corresponding executable code responsible for servicing requests and maintaining the database. Objects in Active Directory databases can be accessed via LDAP. Each object represents a single entity, such as a user. An object is uniquely identified by its name and has a set of attributes—the characteristics and information that the object represents— defined by a schema, which also determines the kinds of objects that can be stored in Active Directory. LDAP is an open, vendor-neutral, industry standard application protocol for accessing and maintaining distributed directory information services over an Internet Protocol (IP) network. A common use of LDAP is to provide a central place to store usernames, passwords and other associated attributes. This allows many different applications and services to connect to the LDAP server to validate users.

Service providers 108 and 110 are each a set of one or more servers (or other types of computers) that provide a network resource or access to a network resource. For example, service providers 108 and 110 can provide software as a service; be a portal that provides access to a service or data store; be a web site; a data store, etc. Service providers 108 and 110 are connected to the Internet (directly or via intervening networks). In one example implementation, service providers 108 and 110 can be accessed using HTTP. As will be discussed in more detail below with respect to FIG. 3, in one embodiment, access to service providers 108 and 110 is managed by CIAM system 102.

User computing system 106 is operated by a user to access a network resource (IT component) and perform other activities on the Internet (or other network). User computing system 106 can be a desktop computer, laptop computer, smartphone, tablet, smart watch, smart appliance or other type of computer or computing system. User computing system 106 includes a communication interface (e.g., WiFi or wired Ethernet), local memory, SSD or hard disk drive, user interface and a processor (one or multi-core), all of which are connected to each other. The processor is configured (e.g., programmed) to perform the processes described below by executing processor readable code stored on a non-transitory processor readable storage medium.

User computing system 106 includes a browser 130, which is a standard web browser known in the art that is used to browse the Internet (or other networks or a computing device). Examples of browsers are Firefox, Safari, Chrome, Internet Explorer and Edge. Other browsers can also be used.

User computing system 106 can be operated by a user for which there is a user identity record stored in identity data store 122. The user can operate user computing system 106 to access the network resources (IT component) of service providers 108 and 110 via CIAM system 102. In one embodiment, the access management services provided by AM/SO module 120 of CIAM system 102 include Single Sign-On service ("SSO"), which allows a user to authenticate once with CIAM system 102 and then be provided access to multiple authorized network resources managed by CIAM system 102.

In one embodiment, SSO is implemented using Security Assertion Markup Language ("SAML"), which is an open standard for exchanging authentication and authorization data between parties, in particular, between an identity provider (e.g., CIAM system 102) and a service provider (e.g., service providers 108 and 110). SAML is an XML-based markup language for security assertions (statements that service providers use to make access-control decisions).

A SAML assertion contains a packet of security information:

<saml:Assertion . . .>
</saml:Assertion>

SAML assertions are usually transferred from identity providers to service providers. Assertions contain statements that service providers use to make access-control decisions. Three types of statements are provided by SAML:
  1. Authentication statements
  2. Attribute statements
  3. Authorization decision statements Authentication statements assert to the service provider that the principal did indeed authenticate with the identity provider at a particular time using a particular method of authentication. Other information about the authenticated principal (called the authentication context) may be disclosed in an authentication statement. An attribute statement asserts that a subject is associated with certain attributes. An attribute is simply a name-value pair. Relying parties use attributes to make access-control decisions. An authorization decision statement asserts that a subject is permitted to perform action A on resource R given evidence E.

Figure 3:
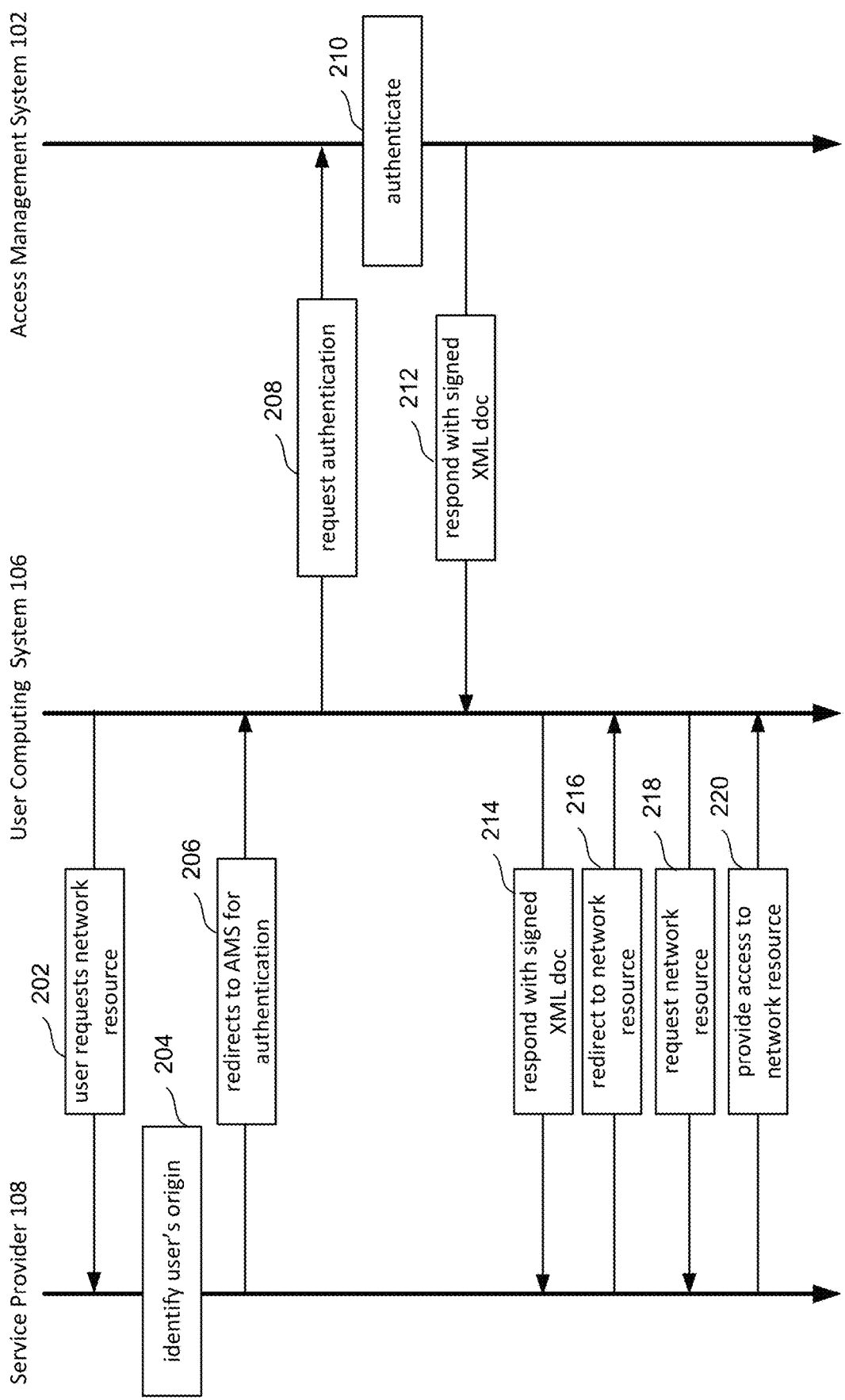
FIG. 3 is a process flow diagram describing IAM services.

FIG. 3 is a process flow diagram describing identity and access management services using SAML, including user computing system 106 gaining access to a network resource (IT component) of service provider 108 CIAM system 102 (which provides SSO). In the example flow of FIG. 3, SAML is used starting with step 208. The depicted exchanges are front-channel exchanges, that is, an HTTP user agent (e.g., browser 130) communicates with a SAML entity. Front-channel exchanges lead to simple protocol flows where all messages are passed by value using a simple HTTP binding (GET or POST). Alternatively, for increased security or privacy, messages may be passed by reference. For example, an identity provider may supply a reference to a SAML assertion (called an artifact) instead of transmitting the assertion directly through the user agent. Subsequently, the service provider requests the actual assertion via a back channel. Such a back-channel exchange is specified as a SOAP message exchange (SAML over SOAP over HTTP). In general, a SAML exchange over a secure back channel is conducted as a SOAP message exchange. The use of SOAP as a binding mechanism is optional, however, as a given SAML deployment can choose whatever bindings are appropriate.

In step 202, user computing system 202 sends a request (e.g., HTTP) to service provider 108 for access to the network resource (IT component). This could be in the form of the user clicking a link, clicking a bookmark, typing an address or typing URL in browser 130. Upon receipt of the request, service provider 108 identifies the user's origin in step 204. For example, service provider 108 may discover the user's IP address, application subdomain, or similar. Based on the user's origin, the service provider determines that the user is associated with CIAM system 102 and in step 206 service provider 108 redirects user computing system 106 to CIAM system 102.

In step 208, user computing system 106 sends a request to CIAM system 102 for authentication (e.g., including SSO). This request identifies the network resource (IT component) for which access is sought. In step 210, CIAM system 102 performs the necessary authentication, if needed. More details of step 210 are provided by the flow chart of FIG. 4. As part of successfully authenticating the user, CIAM system 102 creates an XML document that is securely signed with an X.509 certificate (e.g., private key), as described below. In step 212, CIAM system 102 sends the signed XML document in a response to user computing system 106. In step 214, user computing system 106 posts the signed XML document to service provider 108.

Service provider 108 already knows CIAM system 102 and has a X.509 certificate fingerprint. Service provider 108 uses its X.509 certificate fingerprint (e.g., public key) to validate the signature. Once the signature is validated, service provider 108 trusts that the user associated with the user ID in the signed XML document is properly authenticated and authorized to access the network resource (IT component). Therefore, in step 216 service provider 108 creates a security context at service provider 108 and redirects user computing system 106 to the network resource (IT component). In step 218, user computing system 106 uses the URL from the redirection of step 216 to request access to the target network resource (IT component). Since the security context exists, in step 220 service provider 108 returns the resource to user computing system 106.

Figure 4:
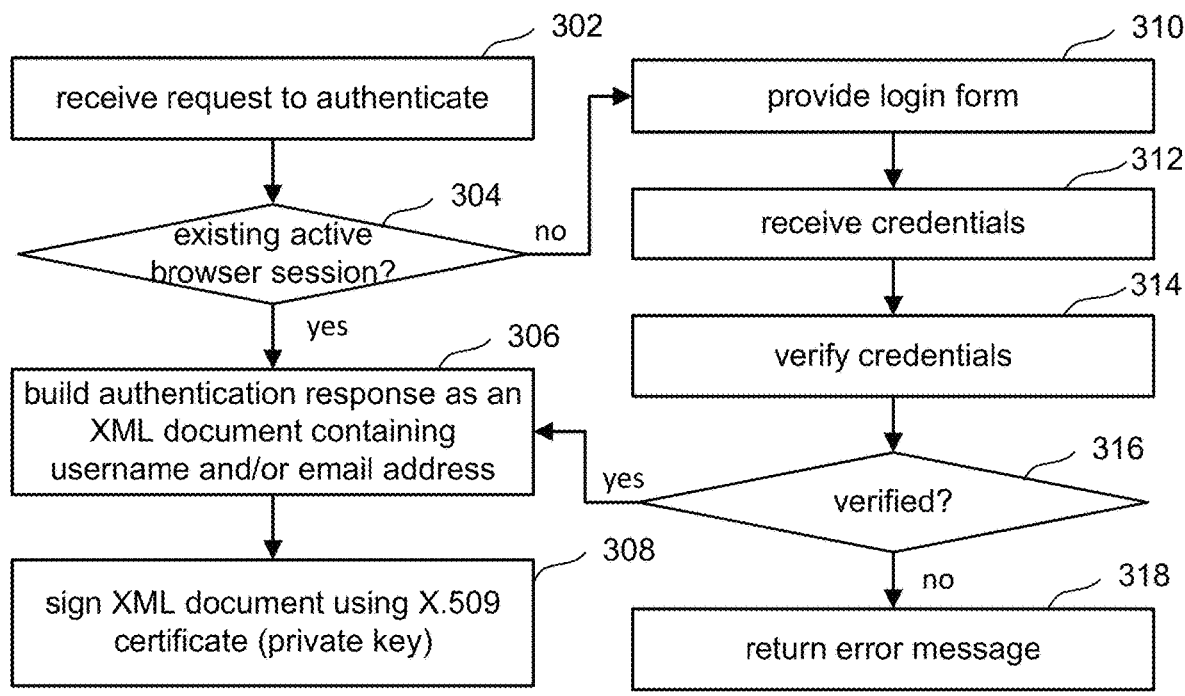
FIG. 4 is a flow chart describing one embodiment of a process for authenticating.

FIG. 4 is a flow chart describing one embodiment of a process for authenticating. The process of FIG. 4 is one example implementation of step 210 of FIG. 3, and is performed by CIAM system 102. In step 302, CIAM system 102 receives the request to authenticate from user computer system 106 (see step 208 of FIG. 3). The user either has an existing active browser session with CIAM system 102 or establishes one (step 304). If the user has an existing active browser session with CIAM system 102 then in step 306 CIAM system 102 builds an authentication response as an XML document that contains the username, userID and/or user's email address. In one embodiment, the XML document generated in step 306 does not include the user's password, the hash of the user's password or any other representation of the user's password. In step 308, CIAM system 102 signs the XML document using an X.509 certificate (e.g., private key).

If (step 304) the user does not have an existing active browser session with CIAM system 102 then in step 310 CIAM system 102 provides a login form. In step 312, CIAM system 102 receives the credentials entered by the user. For example, the form may request a username and password. In step 314, CIAM system 102 verifies that the received credentials (e.g., username and password) match the credentials stored in identity data store 122. In one embodiment, CIAM system 102 obtains the salt for the username and creates a hash of the password using bcrypt. That hash is then compared to the hash stored in identity data store 122 for the username to see if they match. If they match, the credentials are verified (step 316) and the user is authenticated. An active browser session is created at browser 130, and the process continues at step 306. If the newly created hash does not match the hash stored in identity data store 122 (step 316), then an error message is returned in step 318 (e.g., user is denied access to network resource). Although the above example described matching a username and password, other credentials can also be used to authenticate.

Figure 5:
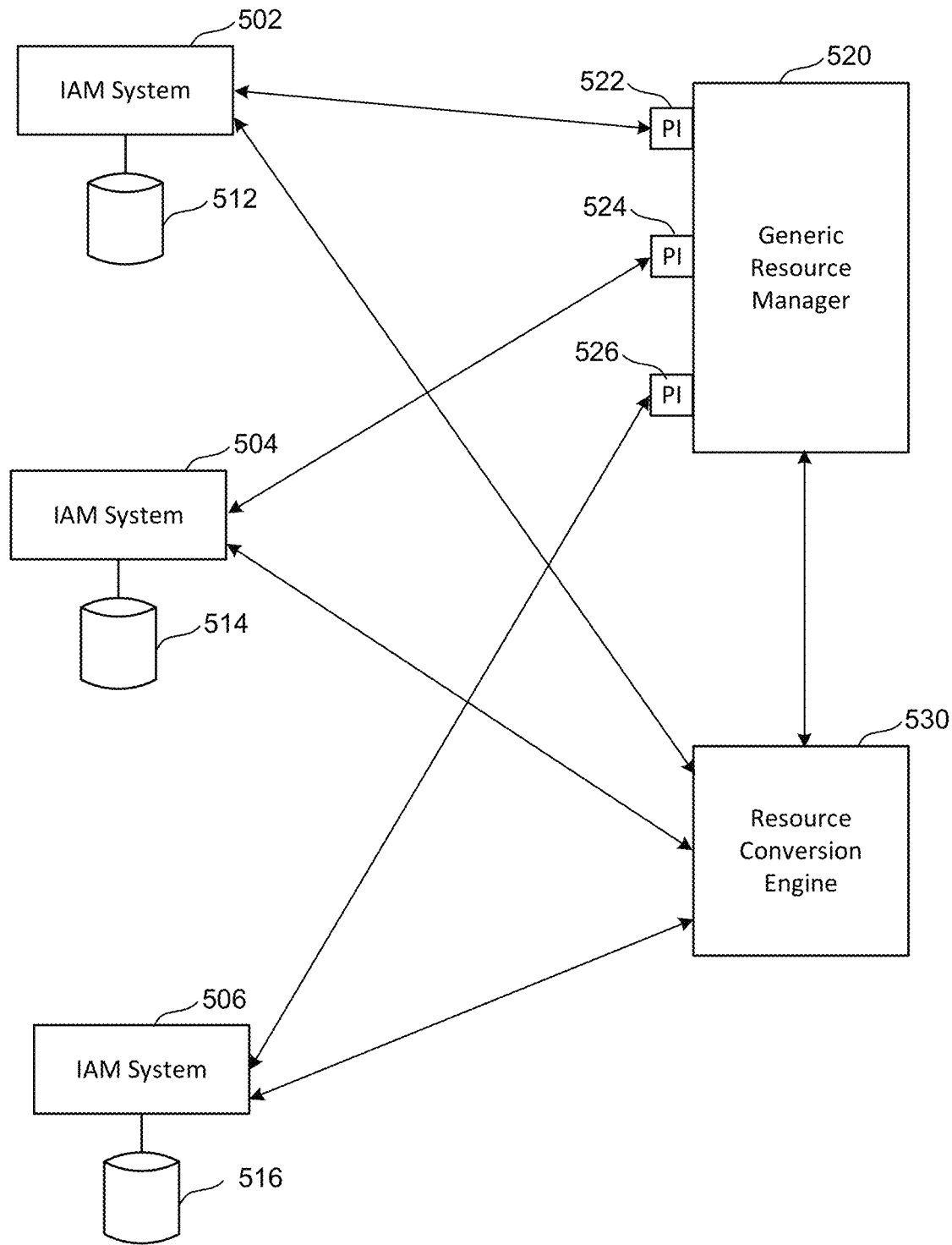
FIG. 5 is a block diagram depicting multiple IAM systems, a resource conversion engine and a generic resource manager.

FIG. 5 depicts multiple IAM systems 502, 504 and 506. Although FIG. 5 shows three IAM systems, more or less than three can be implemented. In one embodiment, each of the three IAM systems 502, 504 and 506 are CIAM systems. In one embodiment, each of the three IAM systems 502, 504 and 506 implement CIAM system 102 and can perform the processes of FIGS. 3 and 4. Each of the three IAM systems 502, 504 and 506 include an identity data store. For example, IAM system 502 is connected to (or otherwise includes) identity data store 512, IAM system 5024 is connected to (or otherwise includes) identity data store 514, and IAM system 506 is connected to (or otherwise includes) identity data store 516. In one embodiment, each of identity data stores 512, 514 and 516 implement identity data store 122 of FIG. 1, including the identity records that comprises the set of fields of data depicted in FIG. 2. In one embodiment, each of IAM systems 502, 504 and 506 are from different providers, use different formats for their data and use different fields of data. In one embodiment, one or more of IAM systems 502, 504 and 506 use different sets of fields of data than that depicted in FIG. 2.

FIG. 5 also depicts Resource Conversion Engine 530, which is used to synchronize resources between IAM systems 502, 504, and 506, as described below. In one embodiment, Resource Conversion Engine 530 comprises software running on one or multiple servers (or other types of computers). Each of those servers includes a communication interface (e.g., WiFi or wired Ethernet), local memory, SSD or hard disk drive, user interface and one or more processors (one or multi-core), all of which are connected to each other. The one or more processors are configured (e.g., programmed) to perform the processes described below by executing processor readable code stored on a non-transitory processor readable storage medium. Resource Conversion Engine 530 is in bidirectional communication (e.g., electronic communication) with IAM systems 502, 504 and 506 via the Internet or other network(s) (or via a direct link).

FIG. 5 also depicts Generic Resource Manager 520, which is used to provision resources in IAM systems 502, 504, and 506. Generic Resource Manager 520 is referred to as "generic" because it can provision resources in many different types of IAM systems. To work with and communicate with different types of IAM systems, Generic Resource Manager 520 makes use of plug-ins. For example, plug-in 522 defines how Generic Resource Manager 520 will work and communicate with IAM system 502, plug-in 524 defines how Generic Resource Manager 520 will work and communicate with IAM system 504, and plug-in 526 defines how Generic Resource Manager 520 will work and communicate with IAM system 506. Each plug-in also defines data sources and resource types for its respective IAM system. Examples of resources include applications, users, groups, roles, policies, authorized servers, virtual servers, and privileges.

In one embodiment, Generic Resource Manager 520 comprises software running on one or multiple servers (or other types of computers). Each of those servers includes a communication interface (e.g., WiFi or wired Ethernet), local memory, SSD or hard disk drive, user interface and one or more processors (one or multi-core), all of which are connected to each other. The one or more processors are configured (e.g., programmed) to perform the processes described below by executing processor readable code stored on a non-transitory processor readable storage medium. Generic Resource Manager 520 is in bidirectional communication (e.g., electronic communication) with IAM systems 502, 504 and 506, as well as Resource Conversion Engine 530, via the Internet or other network(s) (or via a direct link).

One example embodiment of Generic Resource Manager 520 is Terraform, a SaaS or a hosted application that provides infrastructure automation for provisioning, compliance, and management of any cloud, infrastructure, and service. Terraform allows infrastructure to be expressed as code in a simple, human readable machine language (syntax) called HashiCorp Configuration Language (HCL). HCL allows for concise descriptions of resources using blocks, arguments, and expressions. Terraform reads configuration files and provides an execution plan of changes, which can be reviewed for safety and then applied and provisioned. Terraform applies the HCL file to instruct an IAM to create, edit and/or remove resources in order for the IAM implementation for the tenant to match the HCL file. More detail about Terraform can be found at https://www.terraform.io.

Resource Conversion Engine 530 is capable of performing a two staged, two output data conversion process that synchronizes resources between any two of IAM systems 502, 504 and 506. In one embodiment, Resource Conversion Engine 530 performs the data conversion and synchronization using Generic Resource Manager 520.

For example, an organization using IAM system 502 (i.e., the organization owning the data is referred to as the tenant) may wish to migrate from IAM system 502 to IAM system 504 because they are dissatisfied with IAM system 504. The organization (tenant) may wish to use IAM system 502 in parallel with IAM system 504 for fault tolerance purposes or to hedge against an outage of one system. Alternatively, the organization (tenant) may be satisfied with its use of IAM system 502, but due to a temporary loss of service of IAM system 502 the organization (tenant) needs to (temporarily or permanently) migrate to IAM system 504.

Figure 6:
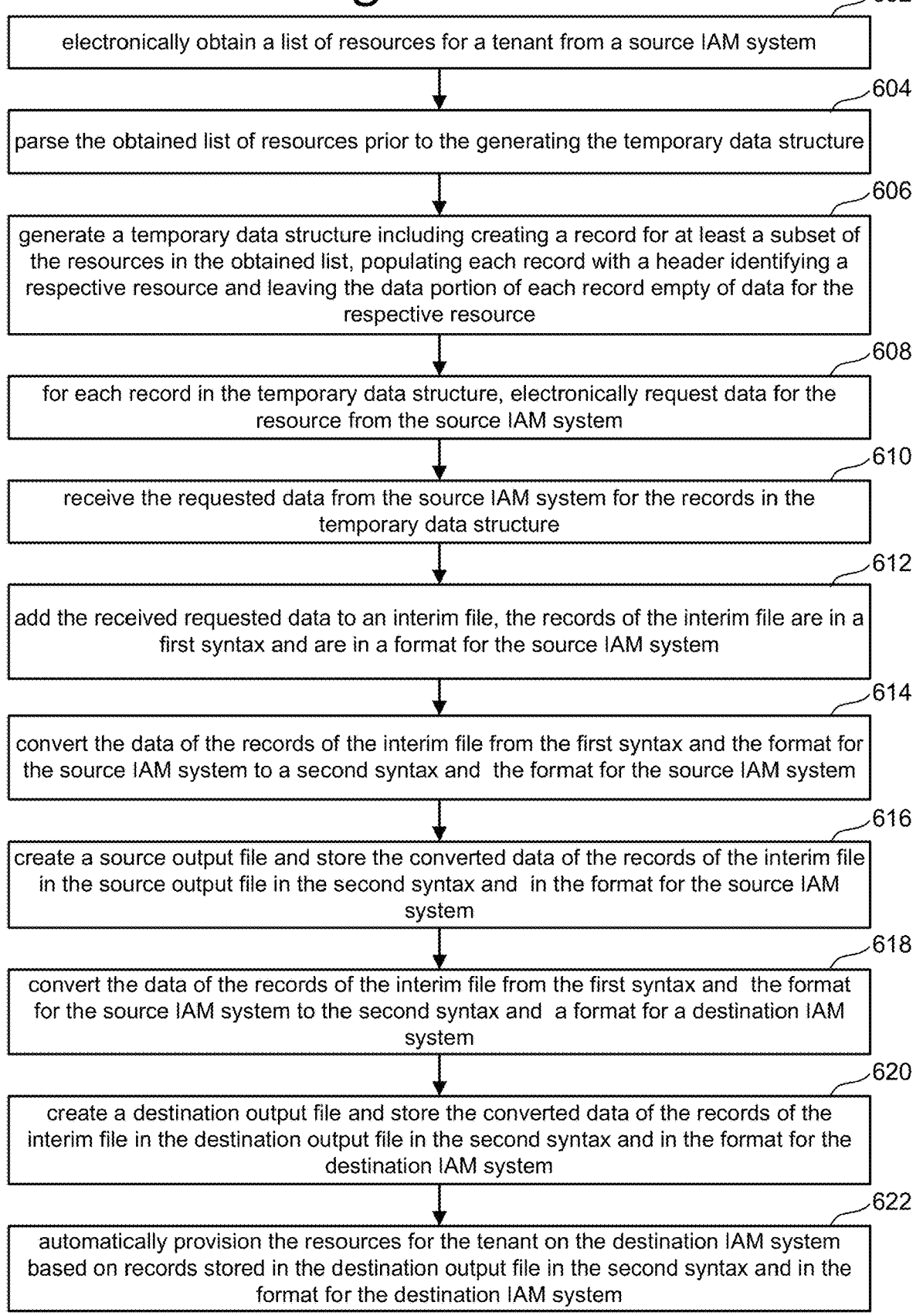
FIG. 6 is a flow chart describing one embodiment of a process for synchronizing resources between IAM systems.

FIG. 6 is a flow chart describing one embodiment of a process for synchronizing resources between IAM systems. The process of FIG. 6 is a two staged, two output data conversion system that synchronizes resources between IAM systems (including CIAM systems). In one embodiment, the process of FIG. 6 is performed by Resource Conversion Engine 530. In some embodiments, a portion (identified below) of the process of FIG. 6 is performed by Generic Resource Manager 520 at the direction of Resource Conversion Engine 530 or another entity (e.g., the user of Resource Conversion Engine 530). In other embodiments, other servers/computers (other than Resource Conversion Engine 530) can perform the process of FIG. 6. The process of FIG. 6 can also be performed by other computers (including servers). Although the process of FIG. 6 can be used to converting data and synchronizing between any two IAM system, for example purposes only the discussion below assumes a migration from source IAM system 502 to destination IAM system 504.

In step 602 of FIG. 6, Resource Conversion Engine 530 electronically obtain a list of resources for a tenant from a source IAM system (e.g., IAM system 502). For example, Resource Conversion Engine 530 will use one or more HTTP GET commands to access a list of resources for a tenant from a source IAM system 502 via an API for IAM system 502. In step 604, Resource Conversion Engine 530 parses the list of resources obtained in step 602. In step 606, after parsing the list of resources, Resource Conversion Engine 530 generates a temporary data structure (e.g., in memory), including creating a record for at least a subset of the resources in the obtained list, populating each record with a header identifying a respective resource and leaving the data portion of each record empty of data for the respective resource. Examples of resources for a IAM system include (but are not limited to) applications, users, groups, roles, policies, authorized servers, virtual servers, and privileges. In one embodiment, the syntax of the temporary data structure is in HCL. An example of a record of the temporary data structure after step 606 is as follows:

```
resource srcID
{
}
```

In one embodiment, the temporary data structure generated in step 606 is stored in a .tf file. In step 608, for each record in the temporary data structure, Resource Conversion Engine 530 electronically requests data for the resource from the source IAM system 502. In step 610, Resource Conversion Engine 530 receives the requested data from the source IAM system 502. In step 612, Resource Conversion Engine 530 adds the received requested data to an interim file (or other form/type of data structure in memory or on disk). The records of the interim file are in a first syntax and are in a format for the source IAM system 502. One example of the first syntax is JavaScript Object Notification (JSON). In one embodiment, Resource Conversion Engine 530 issues GET commands to source IAM system 502 via an API, and inserts that obtained data into the interim file. In another embodiment, Resource Conversion Engine 530 sends a command to Generic Resource Manager 520 to obtain the data and inserts that obtained data into the interim. In one embodiment, the interim file is a tfstate file (stored in memory and/or on disk). Step 612 completes the first stage of the conversion, with the output of the first stage (in one embodiment) being a tfstate file using JSON syntax. The second stage of the conversion (e.g., step 614-622) comprises creating two output files: one output for the source IAM system 502 and one output file for the destination IAM system 504.

In step 614, Resource Conversion Engine 530 converts the data of the records of the interim file from the first syntax and the format for the source IAM system to a second syntax and the format for the source IAM system. In one example embodiment, the second syntax is HCL; however, other syntaxes can also be used. In step 616, Resource Conversion Engine 530 creates a source output file and stores the converted data of the records of the interim file in the source output file in the second syntax and in the format for the source IAM system. In one embodiment, the source output file is the .tf file created in step 606, and step 616 includes filling in the data portion of each record for each of the resources that already have header information in the .tf file. In step 618, Resource Conversion Engine 530 converts the data of the records of the interim file from the first syntax and the format for the source IAM system to the second syntax and a format for a destination IAM system. In step 620, Resource Conversion Engine 530 creates a destination output file and stores the converted data of the records of the interim file in the destination output file in the second syntax and in the format for the destination IAM system. In one embodiment, the destination output file is a .tf file (e.g., a copy of the .tf file created in step 606), and step 620 includes filling in the data portion of each record for each of the resources that already have header information in the .tf file. In step 622, Resource Conversion Engine 530 automatically provisions the resources for the tenant on the destination IAM system 504 based on records stored in the destination output file in the second syntax and in the format for the destination IAM system. In one example embodiment, Resource Conversion Engine 530 invokes Generic Resource Manager 520 to apply the HCL file comprising the destination output file to create/provision the resources on the destination IAM system 504. In one embodiment, steps 614/616 are performed concurrently with steps 618/620. In another embodiment, steps 614/616 are performed serially with steps 618/620.

The different formats of the source IAM system and the destination IAM system may be due to different fields. For example, the source IAM system may represent a user by two fields: first_name and last_name. On the other hand, the destination IAM system may represent a user by one field: fullname. Other differences can also exist. FIG. 2, for example, represents the format of one IAM system. Another IAM system can use a format that is different from FIG. 2, for example, having different fields, having additional fields or missing some fields from FIG. 2.

Figure 7:
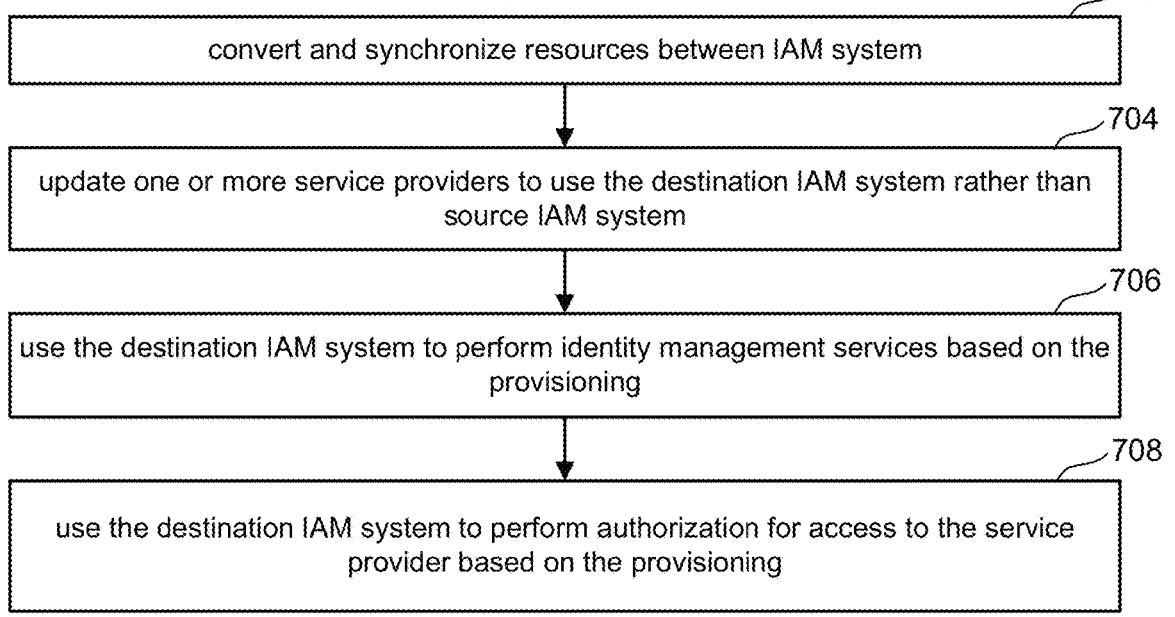
FIG. 7 is a flow chart describing one embodiment of a process for migrating from one IAM system to another IAM system.

FIG. 7 is a flow chart describing one embodiment of a process for migrating from one IAM system to another IAM system. In one embodiment, the process of FIG. 7 is performed by Resource Conversion Engine 530. In some embodiments, a portion (identified below) of the process of FIG. 7 is performed by Generic Resource Manager 520 at the direction of Resource Conversion Engine 530 or another entity (e.g., the user of Resource Conversion Engine 530). In other embodiments, other servers/computers (other than Resource Conversion Engine 530) can perform the process of FIG. 7. The process of FIG. 7 can also be performed by other computers (including servers).

In step 702, Resource Conversion Engine 530 converts and synchronizes resources between IAM systems. For example, the process of FIG. 6 is performed. In step 704, Resource Conversion Engine 530 or another computing system is used to update one or more Service Providers to use the destination IAM system 504 rather than source IAM system 502. For example, looking back at FIG. 3, step 206 includes the Service Provider determining that the user is associated with an IAM system and, therefore, redirects user the computing system to the CIAM system. In one embodiment, the Service Provide includes configuration information that indicates that a set of users should be redirected to a particular IAM system for authentication and authorization. Step 704 of FIG. 7 includes updating that configuration information such that users seeking to access the Service Provider will be redirected to IAM system 504 rather than IAM system 502 in order for authentication and authorization. In step 706, the destination IAM system 504 is used to perform identity management services based on the provisioning of step 622. In step 708, the destination IAM system 504 is used to perform authorization for access to the service provider based on the provisioning of step 622. In one embodiment, steps 706 and 708 comprise performing the processes of FIGS. 3 and 4 using IAM system 504.

Figure 8:
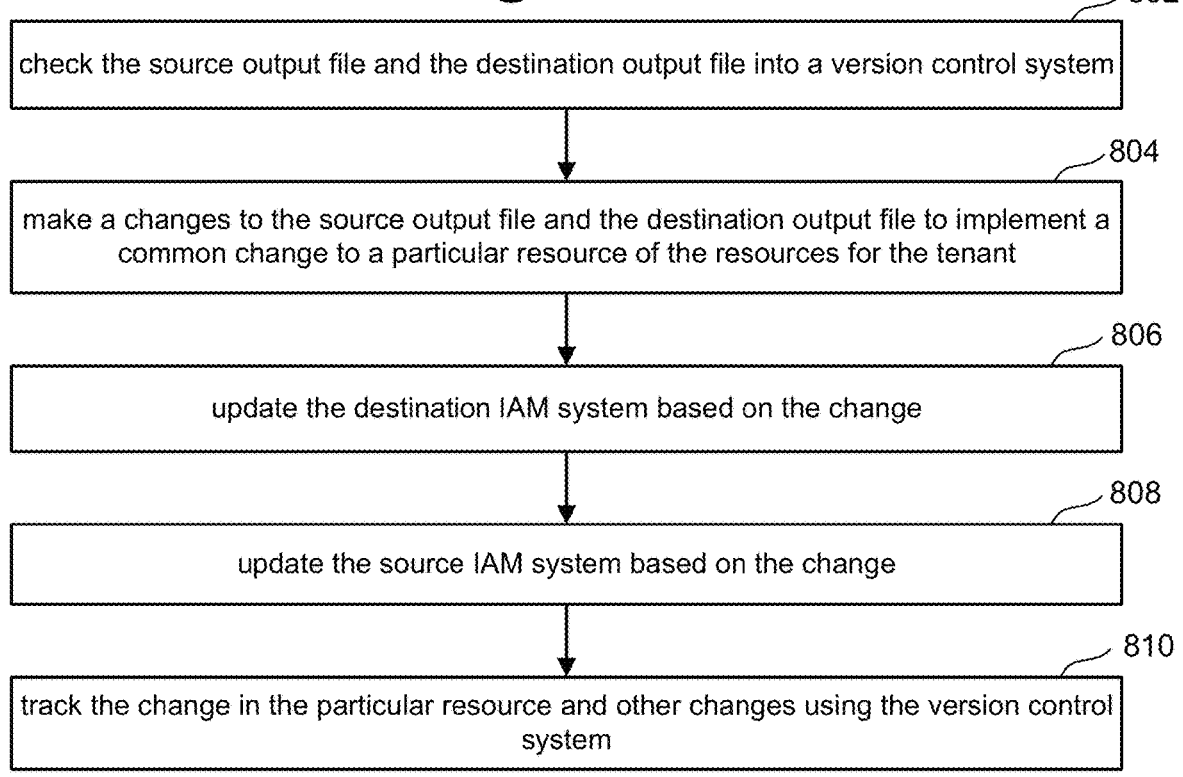
FIG. 8 is a flow chart describing one embodiment of a process for managing multiple IAM systems.

FIG. 8 is a flow chart describing one embodiment of a process for managing multiple IAM systems. In one embodiment, the process of FIG. 8 is performed by Resource Conversion Engine 530. In some embodiments, a portion (identified below) of the process of FIG. 8 is performed by Generic Resource Manager 520 at the direction of Resource Conversion Engine 530 or another entity (e.g., the user of Resource Conversion Engine 530). In other embodiments, other servers/computers (other than Resource Conversion Engine 530) can perform the process of FIG. 8. The process of FIG. 8 can also be performed by other computers (including servers). In one embodiment, the process of FIG. 8 is performed after performing the process of FIG. 6 or after performing the process of FIG. 7.

In step 802, the source output file and the destination output file are checked into a version control system (also known as a source control system) used to manage software. In software engineering, version control is a class of systems responsible for managing changes to computer programs, documents, large web sites, or other collections of information. Version control is a component of software configuration management. In step 804, changes are made to the source output file and the destination output file to implement a common change to a particular resource of the resources for the tenant. In step 806, the destination IAM system 504 is updated based on the change. For example, step 804 can include automatically or manually changing the HCL file for the destination IAM system 504 and step 806 includes automatically or manually invoking the Generic Resource Manager 520 to apply the updated HCL file to destination IAM system 504. In step 808, the source IAM system 502 is updated based on the change. For example, step 804 can include automatically or manually changing the HCL file for the source IAM system 502 and step 806 includes automatically or manually invoking the Generic Resource Manager 520 to apply the updated HCL file to update destination IAM system 502. Step 810 includes tracking the change in the particular resource and other changes using the version control system. For example, the updated HCL files are checked into the version control system.

FIG. 9 is a flow chart describing one embodiment of a process for migrating to a new IAM system and subsequently migrating back to the original IAM system. In one embodiment, the process of FIG. 9 is performed by Resource Conversion Engine 530. In some embodiments, a portion (identified below) of the process of FIG. 9 is performed by Generic Resource Manager 520 at the direction of Resource Conversion Engine 530 or another entity (e.g., the user of Resource Conversion Engine 530). In other embodiments, other servers/computers (other than Resource Conversion Engine 530) can perform the process of FIG. 9. The process of FIG. 9 can also be performed by other computers (including servers). In one embodiment, the process of FIG. 9 is performed after performing the process of FIG. 6 or after performing the process of FIG. 7.

In step 902 of FIG. 9, the source output file is edited (manually or automatically) to remove data content for all of the resources. As a result, a new output file for source IAM system 502 is created. In one embodiment, step 902 includes removing everything from the source output file to create an empty file. In another embodiment, the new output file includes only the headers (e.g., same as output of step 606) or the new output file has all of the data removed for each field. Step 904 includes provisioning resources in the source IAM system 502 based on the new output file for source IAM system 502, thereby causing removal all data for the resources for the tenant in source IAM system 502. One example embodiment of step 904 includes (manually or automatically) invoking Generic Resource Manager 520 to apply the new output file (e.g., an HCL file) to update the provisioning of the resources on the source IAM system 502. In an embodiment that includes migrating from source IAM system 502 to destination IAM system 504, steps 902 and 904 can be appended to the process of FIG. 7 to remove the tenant's installation on source IAM system 502.

In step 906, subsequent to the provisioning resources in the source IAM system based on the new output file, it is determined to restore the resources for the tenant in source IAM system 502. In response to the determining a need to restore the resources for the tenant in source IAM system 502 in step 908, the resources for the tenant are restored in source IAM system 502 by provisioning resources in the source IAM system 502 based on the source output file. For example, Generic Resource Manager 520 can be invoked to provision resources on source IAM system 502 based on the source output file (e.g., an HCL file). In step 910, content of the destination output file is edited to remove data content for the resources and create updated destination output file. Step 910 is similar to step 902, but operates on the destination output file rather than the source output file. Step 912 includes provisioning resources in the destination IAM system 504 based on the updated destination output file for destination IAM system 504, thereby causing removal all data for the resources for the tenant in destination IAM system 504. One example embodiment of step 910 includes (manually or automatically) invoking Generic Resource Manager 520 to apply the updated destination output file (e.g., an HCL file) to update the provisioning of the resources on the destination IAM system 504. The process of FIG. 9 is an example of migrating to destination IAM system 504 and then migrating back to source IAM system 502.

A new system has been disclosed that converts data and synchronizes resources between cloud-based identity and access management (IAM) systems/platforms.

One embodiment includes a method for synchronizing resources between identity and access management (IAM) systems, comprising: electronically obtaining a list of resources for a tenant from a source IAM system; generating a temporary data structure including creating a record for at least a subset of the resources in the obtained list, populating each record with a header identifying a respective resource and leaving the data portion of each record empty of data for the respective resource; for each record in the temporary data structure, electronically requesting data for the resource from the source IAM system; receiving the requested data from the source IAM system for the records in the temporary data structure; adding the received requested data to an interim file based on the headers, the records of the interim file are in a first syntax and are in a format for the source IAM system; converting the data of the records of the interim file from the first syntax and the format for the source IAM system to a second syntax and the format for the source IAM system; creating a source output file and storing the converted data of the records of the interim file in the source output file in the second syntax and in the format for the source IAM system; converting the data of the records of the interim file from the first syntax and the format for the source IAM system to the second syntax and a format for a destination IAM system; creating a destination output file and storing the converted data of the records of the interim file in the destination output file in the second syntax and in the format for the destination IAM system; and automatically provisioning the resources for the tenant on the destination IAM system based on records stored in the destination output file in the second syntax and in the format for the destination IAM system.

In one example implementation: the electronically obtaining the list of resources comprises issuing a plurality of HTTP GET commands; the interim file is a tfstate file; the first syntax is JavaScript Object Notification (JSON); the second syntax is HashiCorp Configuration Language; and the resources include any one or more of applications, users, groups, roles, policies, authorized servers, virtual servers, and privileges.

One example implementation includes a generic resource manager performing the electronically requesting data for the resource from the source IAM system for each record in the temporary data structure; the source output file and the destination output file are readable and usable by the generic resource manager; the automatically provisioning the resources for the tenant on the destination IAM system comprises requesting the generic resource manager to automatically create the resources for the tenant on the destination IAM system based on the destination output file; editing content of the source output file to remove data content for the resources and create new output file; causing the generic resource manager to provision resources in the source IAM system based on the new output file, causing removal all data for the resources for the tenant in source IAM system; subsequent to the provisioning resources in the source IAM system based on the new output file, determining a need to restore the resources for the tenant in source IAM system; and in response to the determining a need to restore the resources for the tenant in source IAM system, causing the generic resource manager to restore the resources for the tenant in source IAM system by provisioning resources in the source IAM system based on the source output file.

One embodiment includes a method for synchronizing resources between systems, comprising: electronically requesting data for a plurality of resources from a source cloud-based system; receiving the requested data from the source cloud-based system, the received data is in a first syntax and in a format for the source cloud-based system; converting the received data from the first syntax and the format for the source cloud-based system to a second syntax and the format for the source cloud-based system; creating a source output file and storing the converted data in the source output file in the second syntax and in the format for the source cloud-based system; converting the received data from the first syntax and the format for the source cloud-based system to the second syntax and a format for a destination cloud-based system; creating a destination output file and storing the converted data in the destination output file in the second syntax and in the format for the destination cloud-based system; and automatically provisioning the plurality of resources on the destination cloud-based system based on the destination output file in the second syntax and in the format for the destination cloud-based system.

In one embodiment, the technology described herein is implemented in software running on or across one or more computing devices. An example of a suitable computing device includes one or more processors (one or more cores), a non-transitory processor readable storage medium connected to the one or more processors and one or more input/out devices (WiFi interface, LAN interface, modem, etc.) connected to the one or more processors. The non-transitory processor readable storage medium stores processor readable code that programs the one or more processors to implement a method for synchronizing resources between systems. That method comprises any of the steps discussed above, including (but not limited to): obtaining data for a plurality of resources from a source identity and access management (TAM) system; generating an interim file for the obtained data including creating a record for each resource of the plurality of resources, the records of the interim file are in a first syntax and are in a format for the source TAM system; converting the data of the records of the interim file from the first syntax and the format for the source TAM system to a second syntax and the format for the source TAM system; creating a source output file and storing the converted data of the records of the interim file in the source output file in the second syntax and in the format for the source TAM system; converting the data of the records of the interim file from the first syntax and the format for the source TAM system to the second syntax and a format for a destination TAM system; creating a destination output file and storing the converted data of the records of the interim file in the destination output file in the second syntax and in the format for the destination TAM system; and automatically provisioning the plurality of resources on the destination TAM system based on the records of the interim file in the destination output file.

For purposes of this document, a "computer" is a device for storing and/or processing data. A computer can include a desktop computer, a laptop computer, a server, a smartphone, a smart watch, a smart appliance, and any other machine that stores or processes data.

For purposes of this document, a "form" is a document, page or the like that includes one or more spaces for entering information. A computer based form is a form that is generated and displayed by a computer.

For purposes of this document, reference in the specification to "an embodiment," "one embodiment," "some embodiments," or "another embodiment" may be used to describe different embodiments or the same embodiment.

For purposes of this document, a connection may be a direct connection or an indirect connection (e.g., via one or more other parts). In some cases, when an element is referred to as being connected or coupled to another element, the element may be directly connected to the other element or indirectly connected to the other element via intervening elements. When an element is referred to as being directly connected to another element, then there are no intervening elements between the element and the other element. Two devices are "in communication" if they are directly or indirectly connected so that they can communicate electronic signals between them.

For purposes of this document, the term "based on" may be read as "based at least in part on."

For purposes of this document, without additional context, use of numerical terms such as a "first" object, a "second" object, and a "third" object may not imply an ordering of objects, but may instead be used for identification purposes to identify different objects.

For purposes of this document, the term "set" of objects may refer to a "set" of one or more of the objects.

The foregoing detailed description has been presented for purposes of illustration and description. It is not intended to be exhaustive or to limit to the precise form disclosed. Many modifications and variations are possible in light of the above teaching. The described embodiments were chosen in order to best explain the principles of the proposed technology and its practical application, to thereby enable others skilled in the art to best utilize it in various embodiments and with various modifications as are suited to the particular use contemplated. It is intended that the scope be defined by the claims appended hereto.

What is claimed is:

1. A method for synchronizing resources between identity and access management (IAM) systems, comprising:
   electronically obtaining a list of resources for a tenant from a source IAM system;
   generating a temporary data structure including creating a record for at least a subset of the resources in the obtained list, populating each record with a header identifying a respective resource and leaving the data portion of each record empty of data for the respective resource;
   for each record in the temporary data structure, electronically requesting data for the resource from the source IAM system;
   receiving the requested data from the source IAM system for the records in the temporary data structure;
   adding the received requested data to an interim data file the records of the interim data file are in a first syntax and are in a format for the source IAM system;
   converting the data of the records of the interim data file from the first syntax and the format for the source IAM system to a second syntax and the format for the source IAM system;
   storing the converted data of the records of the interim data file in a source output file in the second syntax and in the format for the source IAM system;
   converting the data of the records of the interim data file from the first syntax and the format for the source IAM system to the second syntax and a format for a destination IAM system;
   storing the converted data of the records of the interim data file in a destination output file in the second syntax and in the format for the destination IAM system; and
   automatically provisioning the resources for the tenant on the destination IAM system based on records stored in the destination output file in the second syntax and in the format for the destination IAM system.

2. The method of claim 1, wherein:
the electronically obtaining the list of resources comprises issuing a plurality of HTTP GET commands.

3. The method of claim 1, further comprising:
parsing the obtained list of resources prior to the generating the temporary data structure.

4. The method of claim 1, wherein:
the interim file is a tfstate file.

5. The method of claim 1, wherein:
the first syntax is JavaScript Object Notification (JSON);
the second syntax is HashiCorp Configuration Language; and
the resources include any one or more applications, users, groups, roles, policies, authorized servers, virtual servers, and privileges.

6. The method of claim 1, further comprising:
using the destination IAM system to perform identity management services based on the provisioning.

7. The method of claim 1, further comprising:
updating a service provider to use the destination IAM system rather than source IAM system; and
using the destination IAM system to perform authorization for access to the service provider based on the provisioning and the updating.

8. The method of claim 1, further comprising:
checking the source output file and the destination output file into a version control system;
making a change to the source output file and the destination output file to implement a change in a particular resource of the resources for the tenant;
updating the destination IAM system based on the change;
updating the source IAM system based on the change; and
tracking the change in the particular resource and other changes using the version control system.

9. The method of claim 1, further comprising:
editing content of the source output file to remove data content for the resources and create new output file; and
provisioning resources in the source IAM system based on the new output file, causing removal all data for the resources for the tenant in source IAM system.

10. The method of claim 9, further comprising:
subsequent to the provisioning resources in the source IAM system based on the new output file, determining a need to restore the resources for the tenant in source IAM system; and in response to the determining a need to restore the resources for the tenant in source IAM system, restoring the resources for the tenant in source IAM system by provisioning resources in the source IAM system based on the source output file.

11. The method of claim 1, wherein:
a generic resource manager performs the electronically requesting data for the resource from the source IAM system for each record in the temporary data structure;
the source output file and the destination output file are readable and usable by the generic resource manager; and
the automatically provisioning the resources for the tenant on the destination IAM system comprises requesting the generic resource manager to automatically create the resources for the tenant on the destination IAM system based on the destination output file.

12. The method of claim 11, further comprising:
editing content of the source output file to remove data content for the resources and create new output file;
causing the generic resource manager to provision resources in the source IAM system based on the new output file, causing removal all data for the resources for the tenant in source IAM system;
subsequent to the provisioning resources in the source IAM system based on the new output file, determining a need to restore the resources for the tenant in source IAM system; and
in response to the determining a need to restore the resources for the tenant in source IAM system, causing the generic resource manager to restore the resources for the tenant in source IAM system by provisioning resources in the source IAM system based on the source output file.

13. A method for synchronizing resources between systems, comprising:
electronically requesting data for a plurality of resources from a source cloud-based system;
receiving the requested data from the source cloud-based system, the received data is in a first syntax and in a format for the source cloud-based system;
converting the received data from the first syntax and the format for the source cloud-based system to a second syntax and the format for the source cloud-based system;
creating a source output file and storing the converted data in the source output file in the second syntax and in the format for the source cloud-based system;
converting the received data from the first syntax and the format for the source cloud-based system to the second syntax and a format for a destination cloud-based system;
creating a destination output file and storing the converted data in the destination output file in the second syntax and in the format for the destination cloud-based system; and
automatically provisioning the plurality of resources on the destination cloud-based system based on the destination output file in the second syntax and in the format for the destination cloud-based system.

14. The method of claim 13, further comprising:
updating a service provider to use the destination cloud-based system rather than the source cloud-based system; and
using the destination cloud-based system to perform authorization for accesses to the service provider based on the provisioning and the updating.

15. The method of claim 13, further comprising:
checking the source output file and the destination output file into a version control system;
making a change to the source output file and the destination output file to implement a change in a particular resource of the resources for the tenant;
updating resources on the destination cloud-based system based on the change;
updating resources on the source cloud-based system based on the change; and
tracking the change and other changes using the version control system.

16. The method of claim 13, further comprising:
editing content of the source output file to remove data content for the resources and create new output file; and
provisioning resources in the source cloud-based system based on the new output file,
causing removal of all data for the resources for the tenant in source IAM system.

17. The method of claim 16, further comprising:
subsequent to the provisioning resources in the source cloud-based system based on the new output file, restoring the resources in the source cloud-based system by provisioning resources in the source cloud-based system based on the source output file.

18. A non-transitory processor readable storage medium storing processor readable code that programs one or more processors to implement a method for synchronizing resources between systems, the method comprising:
obtaining data for a plurality of resources from a source identity and access management (IAM) system;
generating an interim file for the obtained data including creating a record for each resource of the plurality of resources, the records of the interim file are in a first syntax and are in a format for the source IAM system;
converting the data of the records of the interim file from the first syntax and the format for the source IAM system to a second syntax and the format for the source IAM system;
creating a source output file and storing the converted data of the records of the interim file in the source output file in the second syntax and in the format for the source IAM system;
converting the data of the records of the interim file from the first syntax and the format for the source IAM system to the second syntax and a format for a destination IAM system;
creating a destination output file and storing the converted data of the records of the interim file in the destination output file in the second syntax and in the format for the destination IAM system; and
automatically provisioning the plurality of resources on the destination IAM system based on the destination output file.

19. The non-transitory processor readable storage medium of claim 18, wherein the method further comprises:
editing content of the source output file to remove data content for the resources and create new output file; and
provisioning resources in the source IAM system based on the new output file, causing removal all data for the resources for the tenant in source IAM system.

20. The non-transitory processor readable storage medium of claim 19, wherein the method further comprises:
subsequent to the provisioning resources in the source IAM system based on the new output file, restoring the resources for the tenant in source IAM system by provisioning resources in the source IAM system based on the source output file.

* * * * *